(12) United States Patent
Shao et al.

(10) Patent No.: US 10,637,249 B2
(45) Date of Patent: Apr. 28, 2020

(54) INVERTER ANTI-ISLANDING CONTROL SYSTEM

(71) Applicant: HUAWEI TECHNOLOGIES CO., LTD., Shenzhen, Guangdong (CN)

(72) Inventors: Zhangping Shao, Shanghai (CN); Kai Xin, Shanghai (CN); Haibin Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/420,496

(22) Filed: May 23, 2019

(65) Prior Publication Data
US 2019/0280484 A1    Sep. 12, 2019

Related U.S. Application Data

(63) Continuation of application No. PCT/CN2017/092474, filed on Jul. 11, 2017.

(30) Foreign Application Priority Data

Nov. 24, 2016    (CN) .......................... 2016 1 1050777

(51) Int. Cl.
*H02J 3/38*        (2006.01)
*H02M 7/5387*  (2007.01)
(Continued)

(52) U.S. Cl.
CPC ............... *H02J 3/38* (2013.01); *H02J 3/385* (2013.01); *H02J 3/48* (2013.01); *H02J 3/50* (2013.01);
(Continued)

(58) Field of Classification Search
CPC ...... H02J 2003/388; H02M 1/02; H02M 1/04; H02M 1/042; H02M 1/045
See application file for complete search history.

(56) References Cited

U.S. PATENT DOCUMENTS 10,333,390 B2 *   6/2019   Li .......................... H02M 7/44
2002/0060556 A1   5/2002   Wall
(Continued)

FOREIGN PATENT DOCUMENTS

CN    101257209 B    9/2008
CN    101651337 B    2/2010
(Continued)

OTHER PUBLICATIONS

PCT International Search Report and Written Opinion issued in International Application No. PCT/CN2017/092474 dated Oct. 11, 2017, 22 pages (with English translation).
(Continued)

*Primary Examiner* — Alex Torres-Rivera
(74) *Attorney, Agent, or Firm* — Fish & Richardson P.C.

(57) ABSTRACT

An inverter anti-islanding control system includes a phase-shift loop (10) and a drive circuit (20). The phase-shift loop (10) includes a first input end (11), a second input end (12), a third input end (13), a fourth input end (14), a first output end (15), and a second output end (16). The drive circuit (20) includes a first input end (21), a second input end (22), a third input end (23), and an output end (24). The first output end (15) of the phase-shift loop (10) is connected to the first input end (21) of the drive circuit (20), and the second output end (16) of the phase-shift loop (10) is connected to the second input end (22) of the drive circuit (20). In the inverter anti-islanding control system, when an inverter is in an island state, a frequency of an inverter alternating current end voltage is deviated to a second frequency by using the phase-shift loop (10), so that the second frequency triggers frequency protection to disconnect the inverter from an electrical network, to be specific, the inverter is out of the island state.

10 Claims, 7 Drawing Sheets

(51) Int. Cl.
  *H02J 3/50* (2006.01)
  *H02M 1/08* (2006.01)
  *H02J 3/48* (2006.01)
(52) U.S. Cl.
  CPC ....... *H02M 1/081* (2013.01); *H02M 7/53873* (2013.01); *H02J 2003/388* (2013.01)

(56) References Cited

U.S. PATENT DOCUMENTS

| | | | | |
|---|---|---|---|---|
| 2008/0204044 | A1* | 8/2008 | Ponnaluri | H02J 3/38 324/647 |
| 2012/0091817 | A1* | 4/2012 | Seymour | H02J 3/383 307/82 |
| 2013/0077367 | A1* | 3/2013 | Zhu | H02J 3/16 363/97 |
| 2015/0015072 | A1 | 1/2015 | Deboy et al. | |
| 2015/0094871 | A1 | 4/2015 | Bhageria et al. | |

FOREIGN PATENT DOCUMENTS

| | | |
|---|---|---|
| CN | 101931219 A | 12/2010 |
| CN | 101944723 A | 1/2011 |
| CN | 102255329 B | 11/2011 |
| CN | 102522770 A | 6/2012 |
| CN | 103207335 A | 7/2013 |
| CN | 103296643 A | 9/2013 |
| CN | 103515981 B | 1/2014 |
| CN | 103760434 A | 4/2014 |
| CN | 103954870 A | 7/2014 |
| CN | 103983898 A | 8/2014 |
| CN | 104155537 A | 11/2014 |
| CN | 104198886 A | 12/2014 |
| CN | 104215841 A | 12/2014 |
| CN | 104267315 A | 1/2015 |
| CN | 104638671 A | 5/2015 |
| CN | 104865479 A | 8/2015 |
| CN | 105182189 A | 12/2015 |
| CN | 105467237 A | 4/2016 |
| CN | 105759175 A | 7/2016 |
| EP | 2922167 A1 | 9/2015 |
| KR | 20130026091 A | 3/2013 |
| KR | 101554630 B1 | 9/2015 |
| WO | 2009011877 A2 | 1/2009 |

OTHER PUBLICATIONS

Extended European Search Report issued in European Application No. 17874121.1 dated Oct. 31, 2019, 8 pages.

* cited by examiner

INVERTER ANTI-ISLANDING CONTROL SYSTEM

CROSS-REFERENCE TO RELATED APPLICATIONS

This application is a continuation of International Application No. PCT/CN2017/092474, filed on Jul. 11, 2017, which claims priority to Chinese Patent Application No. 201611050777.4, filed on Nov. 24, 2016. The disclosures of the aforementioned applications are hereby incorporated by reference in their entireties.

TECHNICAL FIELD

The present application relates to the field of power system automation technologies, and in particular, to an inverter anti-islanding control system.

BACKGROUND

Direct current electric energy is generated during new energy grid-connected power generation, the direct current electric energy needs to be converted into alternating current electric energy by using an inverter, and then power is supplied to a main electrical network and a load. An island state of the inverter means that when a grid-connected switch trips, the inverter is still connected to the main electrical network because the inverter cannot detect a power-off state of the electrical network, and supplies power to the load as a separate power supply.

There are the following major potential risks caused by the island state for devices and personnel: When corrective maintenance personnel stops power supply of the main electrical network, and performs corrective maintenance on electric power lines and circuit devices, when a new energy inverter still continues to supply power to the load, injuries and deaths of the corrective maintenance personnel are caused. In addition, if the grid connected inverter continues to supply power, after the main electrical network resumes power supply, a relatively great difference may exist between a voltage of the electrical network and an output voltage of the inverter in terms of a phase. Consequently, the device is damaged because a large impulse current is generated within a short moment.

Therefore, the island state needs to be detected by using a method such as communication or a peripheral, passive detection, or active disturbance according to an island detection policy, and the inverter needs to be enabled to disconnect from an island power generation system. However, the island detection policy usually depends on an over/undervoltage or over/underfrequency protection mechanism. When an over/undervoltage or over/underfrequency protection time of an inverter is longer than an island protection time stipulated in a grid connection standard, island detection fails.

Therefore, when a main electrical network is powered off, how to detect an island state of an inverter to disconnect the inverter from the electrical network becomes a problem that urgently needs to be resolved.

SUMMARY

Embodiments of the present application provide an inverter anti-islanding control system, so that when an inverter is in an island state, a frequency of an inverter alternating current end voltage is deviated to a second frequency by using a phase-shift loop, and the second frequency triggers frequency protection to disconnect the inverter from an electrical network, to be specific, the inverter is out of the island state.

An embodiment of the present application discloses an inverter anti-islanding control system, including:

a phase-shift loop and a drive circuit, where the phase-shift loop includes a first input end, a second input end, a third input end, a fourth input end, a first output end, and a second output end; the drive circuit includes a first input end, a second input end, a third input end, and an output end;

the first output end of the phase-shift loop is connected to the first input end of the drive circuit, and the second output end of the phase-shift loop is connected to the second input end of the drive circuit;

the phase-shift loop is configured to perform phase shift conversion on an active voltage instruction $U^*_d$ and a reactive voltage instruction $U^*_q$ based on the inverter alternating current end voltage and frequency protection information in a grid connection standard, to obtain a phase-shifted active voltage instruction $U^*_{ds}$ and a phase-shifted reactive voltage instruction $U^*_{qs}$, where $U_d^*$, $U_q^*$, the inverter alternating current end voltage, and the frequency protection information in the grid connection standard reach the phase-shift loop respectively through the first input end, the second input end, the third input end, and the fourth input end of the phase-shift loop, $U^*_{ds}$ reaches the first input end of the drive circuit through the first output end of the phase-shift loop, and $U^*_{ds}$ reaches the second input end of the drive circuit through the second output end of the phase-shift loop; and the drive circuit is configured to generate a drive signal based on $U^*_{ds}$ and $U^*_{qs}$, where the drive signal reaches the inverter through the output end of the drive circuit, to drive the inverter to output an alternating current voltage having a second frequency, and the second frequency is used to control a connection between the inverter and an electrical network to be disconnected or maintained.

In this implementation, when the inverter is in an island state, the alternating current voltage having the second frequency is output by the inverter by using the phase-shift loop. If the second frequency triggers frequency protection, the inverter is disconnected from the electrical network, to be specific, the inverter is out of the island state, after the inverter is run for a frequency protection time.

In an optional implementation, the phase-shift loop includes a phase shift angle generation circuit and a phase shift matrix circuit, where the phase shift angle generation circuit includes a first input end, a second input end, and an output end; and the phase shift matrix circuit includes a first input end, a second input end, a third input end, a first output end, and a second output end;

the output end of the phase shift angle generation circuit is connected to the third input end of the phase shift matrix circuit;

the phase shift angle generation circuit is configured to generate a phase shift angle based on the inverter alternating current end voltage and the frequency protection information, where the inverter alternating current end voltage and the frequency protection information reach the phase shift angle generation circuit respectively through the first input end and the second input end of the phase shift angle generation circuit, and the phase shift angle reaches the third input end of the phase shift matrix circuit through the output end of the phase shift angle generation circuit; and the phase shift matrix circuit is configured to perform phase shift conversion on $U^*_d$ and $U^*_q$ based on the phase shift angle, to obtain $U^*_{ds}$ and $U^*_{qs}$, where $U^*_d$ and $U^*_q$ reach the phase shift matrix circuit respectively through the first input end and the second input end of the phase shift matrix circuit, $U^*_{ds}$ reaches the first input end of the drive circuit through the first output end of the phase shift matrix circuit, and $U^*_{qs}$ reaches the second input end of the drive circuit through the second output end of the phase shift matrix circuit.

In this implementation, the phase shift angle generation circuit generates the phase shift angle based on the inverter alternating current end voltage and the frequency protection information; and the phase shift matrix circuit performs the phase shift conversion on $U^*_d$ and $U^*_q$ based on the phase shift angle, to obtain $U^*_{ds}$ and $U^*_{qs}$. $U^*_{ds}$ and $U^*_{qs}$ are used to enable the drive circuit to generate the drive signal, to drive the inverter to output the alternating current voltage having the second frequency. If the second frequency triggers the frequency protection, the inverter is disconnected from the electrical network, to be specific, the inverter is out of the island state, after the inverter is run for the frequency protection time.

In an optional implementation, the phase shift angle generation circuit includes a frequency discriminator, a frequency instruction generator, and a controller, where the frequency discriminator includes an input end and an output end; the frequency instruction generator includes a first input end, a second output end, and an output end; and the controller includes a first input end, a second input end, and an output end;

the output end of the frequency discriminator is connected to the second input end of the frequency instruction generator and the first input end of the controller; and the output end of the frequency instruction generator is connected to the second input end of the controller;

the frequency discriminator is configured to output a frequency of the inverter alternating current end voltage as a first frequency based on the inverter alternating current end voltage, where the inverter alternating current end voltage reaches the frequency discriminator through the input end of the frequency discriminator, and the first frequency reaches the second input end of the frequency instruction generator and the first input end of the controller through the output end of the frequency discriminator;

the frequency instruction generator is configured to determine a frequency instruction based on the first frequency and the frequency protection information, where the frequency protection information reaches the frequency instruction generator through the first input end of the frequency instruction generator, and the frequency instruction reaches the second input end of the controller through the output end of the frequency instruction generator; and the controller is configured to determine the phase shift angle based on the first frequency and the frequency instruction, where the phase shift angle reaches the third input end of the phase shift matrix circuit through the output end of the controller.

In this implementation, the frequency discriminator is configured to output the frequency of the inverter alternating current end voltage as the first frequency based on the inverter alternating current end voltage, the frequency instruction generator is configured to determine the frequency instruction based on the first frequency and the frequency protection information, the controller is configured to determine the phase shift angle based on the first frequency and the frequency instruction, and the phase shift matrix circuit performs the phase shift conversion on $U^*_d$ and $U^*_q$ based on the phase shift angle, to obtain $U^*_{ds}$ and $U^*_{qs}$. $U^*_{ds}$ and $U^*_{qs}$ are used to enable the drive circuit to generate the drive signal, to drive the inverter to output the alternating current voltage having the second frequency. If the second frequency triggers the frequency protection, the inverter is disconnected from the electrical network, to be specific, the inverter is out of the island state, after the inverter is run for the frequency protection time.

In an optional implementation, the frequency protection information includes an underfrequency protection threshold $f_{min}$, an underfrequency protection time $T_1$, an overfrequency protection threshold $f_{max}$, and an overfrequency protection time $T_2$;

a normal working frequency range is $f_{min}$ to $f_{max}$; and that the frequency instruction generator is configured to determine a frequency instruction based on the first frequency and the frequency protection information includes:

when the first frequency is within the normal working frequency range, the frequency instruction output by the frequency instruction generator is the first frequency; or when the first frequency is not within the normal working frequency range and $T_1<T_2$, the frequency instruction output by the frequency instruction generator is $f_{min}$; or when the first frequency is not within the normal working frequency range and $T_1>T_2$, the frequency instruction output by the frequency instruction generator is $f_{max}$.

In this implementation, when the first frequency is not within the normal working frequency range, the frequency instruction generator sets a frequency protection threshold with a relatively short protection time as the frequency instruction. Consequently, when the inverter outputs the alternating current voltage having the second frequency, the second frequency is deviated to the frequency protection threshold with the relatively short protection time. Therefore, if the second frequency triggers the frequency protection, the inverter can be disconnected from the electrical network after the inverter is run for the relatively short time. Therefore, in this implementation, when an island effect occurs in the inverter, the inverter can be out of the island state as fast as possible.

In an optional implementation, the drive circuit includes:

a phase locked loop, a rotation transformation matrix circuit, and a drive signal generator, where the phase locked loop includes an input end and an output end; the rotation transformation matrix circuit includes a first input end, a second input end, a third input end, and an output end; and the drive signal generator includes an input end and an output end;

the output end of the phase locked loop is connected to the third input end of the rotation transformation matrix circuit, and the output end of the rotation transformation matrix circuit is connected to the input end of the drive signal generator;

the phase locked loop is configured to obtain phase information of the inverter alternating current end voltage based on the inverter alternating current end voltage, where the inverter alternating current end voltage reaches the phase locked loop through the input end of the phase locked loop, and the phase information of the inverter alternating current end voltage reaches the third input end of the rotation transformation matrix circuit through the output end of the phase locked loop;

the rotation transformation matrix circuit is configured to convert $U^*_{ds}$, and $U^*_{qs}$ into a three-phase modulation signal based on the phase information of the inverter alternating current end voltage, where $U^*_{ds}$ and $U^*_{qs}$ reach the rotation transformation matrix circuit through the first input end and the second input end of the rotation transformation matrix circuit, and the three-phase modulation signal reaches the input end of the drive signal generator through the output end of the rotation transformation matrix circuit; and the drive signal generator is configured to generate the drive signal based on the three-phase modulation signal, where the drive signal reaches the inverter through the output end of the drive signal generator, to drive the inverter to output the alternating current voltage having the second frequency, and the second frequency is used to control the connection between the inverter and the electrical network to be disconnected or maintained.

In this implementation, when the inverter is in the island state, the alternating current voltage having the second frequency is output by the inverter by using the phase-shift loop. If the second frequency triggers the frequency protection, the inverter is disconnected from the electrical network, to be specific, the inverter is out of the island state, after the inverter is run for the frequency protection time.

In an optional implementation, the system further includes:

a maximum power point tracking unit, a direct current voltage control unit, an active current control unit, an anti-islanding policy unit, and a reactive current control unit, where the maximum power point tracking unit includes a first input end, a second input end, and an output end; the direct current voltage control unit includes an input end and an output end; the active current control unit includes an input end and an output end; the anti-islanding policy unit includes an output end; and the reactive current control unit includes an input end and an output end;

the output end of the maximum power point tracking unit is connected to the input end of the direct current voltage control unit, the output end of the direct current voltage control unit is connected to the input end of the active current control unit, and the output end of the anti-islanding policy unit is connected to the input end of the reactive current control unit;

the maximum power point tracking unit is configured to determine, based on a direct current voltage and a direct current at an output end of a new energy power generation module, a maximum power point voltage output by the new energy power generation module, where the direct current voltage and the direct current reach the maximum power point tracking unit through the first input end and the second input end of the maximum power point tracking unit, and the maximum power point voltage reaches the input end of the direct current voltage control unit through the output end of the maximum power point tracking unit;

the direct current voltage control unit is configured to generate an active current instruction based on the maximum power point voltage, where the active current instruction reaches the input end of the active current control unit through the output end of the direct current voltage control unit;

the active current control unit is configured to generate the active voltage instruction $U^*_d$ based on the active current instruction, where $U^*_d$ reaches the first input end of the phase-shift loop through the output end of the active current control unit;

the anti-islanding policy unit is configured to generate a reactive current instruction, where the reactive current instruction reaches the input end of the reactive current control unit through the output end of the anti-islanding policy unit; and the reactive current control unit is configured to generate the reactive voltage instruction $U^*_q$ based on the reactive current instruction, where $U^*_q$ reaches the second input end of the phase-shift loop through the output end of the reactive current control unit.

In this implementation, when the inverter is in the island state, the alternating current voltage having the second frequency is output by the inverter by using the phase-shift loop. If the second frequency triggers the frequency protection, the inverter is disconnected from the electrical network, to be specific, the inverter is out of the island state, after the inverter is run for the frequency protection time.

In an optional implementation, a phase shift matrix corresponding to the phase shift matrix circuit is:

$$\begin{bmatrix} \cos\Delta\theta & \sin\Delta\theta \\ -\sin\Delta\theta & \cos\Delta\theta \end{bmatrix},$$

where $\Delta\theta$ is the phase shift angle.

In this implementation, when the inverter is in the island state, the alternating current voltage having the second frequency is output by the inverter by using the phase-shift loop. If the second frequency triggers the frequency protection, the inverter is disconnected from the electrical network, to be specific, the inverter is out of the island state, after the inverter is run for the frequency protection time.

In an optional implementation, $U^*_{ds}$, and $U^*_{qs}$ are:

$$\begin{cases} U^*_{ds} = U^*_d \cos\Delta\theta - U^*_q \sin\Delta\theta \\ U^*_{qs} = U^*_d \sin\Delta\theta + U^*_q \cos\Delta\theta \end{cases},$$

where $\Delta\theta$ is the phase shift angle.

In this implementation, when the inverter is in the island state, the alternating current voltage having the second frequency is output by the inverter by using the phase-shift loop. If the second frequency triggers the frequency protection, the inverter is disconnected from the electrical network, to be specific, the inverter is out of the island state, after the inverter is run for the frequency protection time.

In an optional implementation, the inverter is any one of a single-phase inverter, a three-phase inverter, a two-level topology inverter, or a multi-level topology inverter.

In this implementation, when the inverter is in the island state, the alternating current voltage having the second frequency is output by the inverter by using the phase-shift loop. If the second frequency triggers the frequency protection, the inverter is disconnected from the electrical network, to be specific, the inverter is out of the island state, after the inverter is run for the frequency protection time.

In an optional implementation, the controller is any one of a proportional controller, a proportional integral controller, or a proportional derivative controller.

In this implementation, when the inverter is in the island state, the alternating current voltage having the second frequency is output by the inverter by using the phase-shift loop. If the second frequency triggers the frequency protection, the inverter is disconnected from the electrical network, to be specific, the inverter is out of the island state, after the inverter is run for the frequency protection time.

It can be learned from the foregoing technical solutions that, the embodiments of the present application have the following advantages:

When the inverter is in the island state, the frequency of the inverter alternating current end voltage deviates from the normal working frequency range. In the embodiments of the present application, the frequency of the inverter alternating current end voltage can be deviated to the second frequency by using the phase-shift loop, so that the second frequency triggers the frequency protection to disconnect the inverter from the electrical network, to be specific, the inverter is out of the island state.

DESCRIPTION OF EMBODIMENTS

In the specification, claims, and accompanying drawings of the present application, the terms "first", "second", and so on are intended to distinguish between different objects but do not indicate a particular order. In addition, the terms "including" and "having" and any other variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, or the device.

An embodiment of the present application provides an inverter anti-islanding control system. The inverter anti-islanding control system is applicable to various grid-connected inverters, which may be a single-phase inverter, a three-phase inverter, a two-level topology inverter, a multi-level topology inverter, or the like. A specific inverter to which the inverter anti-islanding control system is applied is not limited in this embodiment of the present application. In this embodiment of the present application, when an inverter is in an island state, a frequency of an inverter alternating current end voltage may be deviated to a second frequency by using a phase-shift loop, so that the second frequency triggers frequency protection to disconnect the inverter from an electrical network, to be specific, the inverter is out of the island state. Detailed descriptions are separately provided below.

Figure 1:
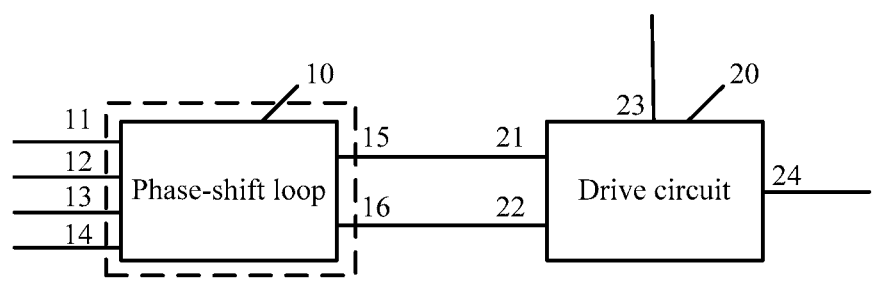
FIG. 1 is a schematic structural diagram of an inverter anti-islanding control system according to an embodiment of the present application.

FIG. 1 is a schematic structural diagram of an inverter anti-islanding control system according to an embodiment of the present application. As shown in FIG. 1, the inverter anti-islanding control system described in this embodiment includes a phase-shift loop 10 and a drive circuit 20.

The phase-shift loop 10 includes a first input end 11, a second input end 12, a third input end 13, a fourth input end 14, a first output end 15, and a second output end 16. The drive circuit 20 includes a first input end 21, a second input end 22, a third input end 23, and an output end 24.

The first output end 15 of the phase-shift loop 10 is connected to the first input end 21 of the drive circuit 20, and the second output end 16 of the phase-shift loop 10 is connected to the second input end 22 of the drive circuit 20.

In this embodiment of the present application, the phase-shift loop 10 performs phase shift conversion on an active voltage instruction $U^*_d$ and a reactive voltage instruction $U^*_q$ based on an inverter alternating current end voltage and frequency protection information in a grid connection standard, to obtain a phase-shifted active voltage instruction $U^*_{ds}$, and a phase-shifted reactive voltage instruction $U^*_{qs}$. $U^*_d$, $U^*_q$, the inverter alternating current end voltage, and the frequency protection information in the grid connection standard reach the phase-shift loop 10 respectively through the first input end 11, the second input end 12, the third input end 13, and the fourth input end 14 of the phase-shift loop 10, $U^*_{ds}$ reaches the first input end 21 of the drive circuit 20 through the first output end 15 of the phase-shift loop 10, and $U^*_{qs}$ reaches the second input end 22 of the drive circuit 20 through the second output end 16 of the phase-shift loop 10.

In this embodiment of the present application, the drive circuit 20 generates a drive signal based on $U^*_{ds}$, $U^*_{qs}$. The drive signal reaches the inverter through the output end 23 of the drive circuit 20, to drive the inverter to output an alternating current voltage having a second frequency, and the second frequency is used to control a connection between the inverter and an electrical network to be disconnected or maintained.

In this embodiment of the present application, the frequency protection information in the grid connection standard includes an underfrequency protection threshold $f_{min}$, an underfrequency protection time $T_1$, an overfrequency protection threshold $f_{max}$, and an overfrequency protection time $T_2$. If the second frequency is lower than $f_{min}$, underfrequency frequency protection is triggered. The connection between the inverter and the electrical network is disconnected after the underfrequency frequency protection is triggered and run for the time $T_1$. If the second frequency is higher than $f_{max}$, overfrequency frequency protection is triggered. The connection between the inverter and the electrical network is disconnected after the overfrequency frequency protection is triggered and run for the time $T_2$. If the second frequency is within a range of $f_{min}$ to $f_{max}$, the connection between the inverter and the electrical network is maintained.

During new energy grid-connected power generation, for example, if a new energy device is a photovoltaic array, a system including the photovoltaic array, an inverter, a transformer, a load, and an electrical network is formed to supply generated power to the electrical network or the load. The photovoltaic array generates direct current electric energy, the inverter converts the direct current electric energy into an alternating current electric energy, and the alternating current electric energy is transferred to the electrical network after being boosted by using the transformer. When the electrical network is powered off, the inverter is still connected to the electrical network because the inverter cannot detect a power-off state of the electrical network, and supplies power to the load as a separate power supply, to be specific, the inverter is in an island state.

When the inverter is in the island state, a frequency of the inverter alternating current end voltage deviates from a normal working range. In this embodiment of the present application, the frequency of the inverter alternating current end voltage can be deviated to the second frequency by using the phase-shift loop, so that the second frequency triggers the frequency protection to disconnect the inverter from the electrical network, to be specific, the inverter is out of the island state.

Figure 2:
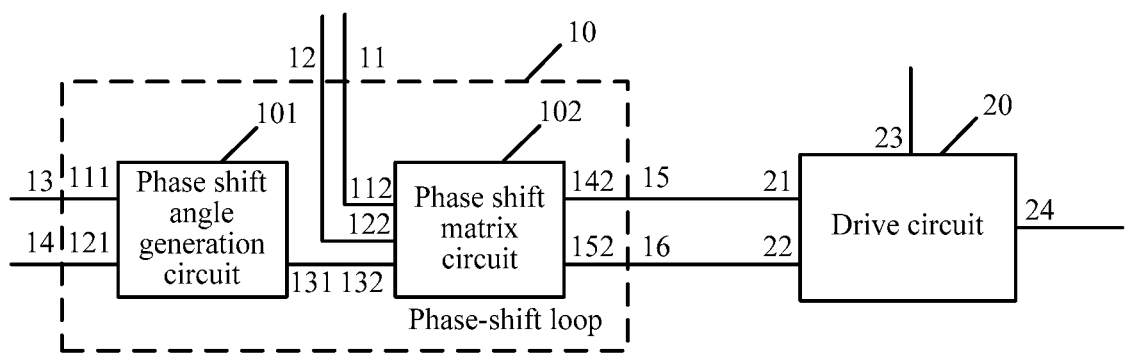
FIG. 2 is a schematic structural diagram of another inverter anti-islanding control system according to an embodiment of the present application.

FIG. 2 is a schematic structural diagram of another inverter anti-islanding control system according to an embodiment of the present application. As shown in FIG. 2, the inverter anti-islanding control system described in this embodiment includes a phase-shift loop 10 and a drive circuit 20.

The phase-shift loop 10 includes a first input end 11, a second input end 12, a third input end 13, a fourth input end 14, a first output end 15, and a second output end 16. The drive circuit 20 includes a first input end 21, a second input end 22, a third input end 23, and an output end 24.

The first output end 15 of the phase-shift loop 10 is connected to the first input end 21 of the drive circuit 20, and the second output end 16 of the phase-shift loop 10 is connected to the second input end 22 of the drive circuit 20.

The phase-shift loop 10 includes a phase shift angle generation circuit 101 and a phase shift matrix circuit 102.

The phase shift angle generation circuit 101 includes a first input end 111, a second input end 121, and an output end 131. The phase shift matrix circuit 102 includes a first input end 112, a second input end 122, a third input end 132, a first output end 142, and a second output end 152.

The output end 131 of the phase shift angle generation circuit 101 is connected to the third input end 132 of the phase shift matrix circuit 102.

The phase shift angle generation circuit 101 generates a phase shift angle based on an inverter alternating current end voltage and frequency protection information in a grid connection standard. The inverter alternating current end voltage and the frequency protection information reach the phase shift angle generation circuit 101 respectively through the first input end 111 and the second input end 121 of the phase shift angle generation circuit 101, and the phase shift angle reaches the third input end 132 of the phase shift matrix circuit 102 through the output end 131 of the phase shift angle generation circuit 101.

The phase shift matrix circuit 102 performs phase shift conversion on an active voltage instruction $U^*_d$ and a reactive voltage instruction $U^*_q$ based on the phase shift angle, to obtain a phase-shifted active voltage instruction $U^*_{ds}$ and a phase-shifted reactive voltage instruction $U^*_{qs}$. $U^*_d$ and $U^*_q$ reach the phase shift matrix circuit 102 respectively through the first input end 112 and the second input end 122 of the phase shift matrix circuit 102, $U_{ds}^*$ reaches the first input end 21 of the drive circuit 20 through the first output end 142 of the phase shift matrix circuit 102, and $U^*_{qs}$ reaches the second input end 22 of the drive circuit 20 through the second output end 152 of the phase shift matrix circuit 102.

Further, a phase shift matrix corresponding to the phase shift matrix circuit 102 is:

$$\begin{bmatrix} \cos\Delta\theta & \sin\Delta\theta \\ -\sin\Delta\theta & \cos\Delta\theta \end{bmatrix},$$

$U^*_{ds}$ and $U^*_{qs}$ are:

$$\begin{cases} U^*_{ds} = U^*_d \cos\Delta\theta - U^*_q \sin\Delta\theta \\ U^*_{qs} = U^*_d \sin\Delta\theta + U^*_q \cos\Delta\theta \end{cases},$$

where

Δθ is the phase shift angle.

When the inverter is in an island state, a frequency of the inverter alternating current end voltage deviates from a normal working range. In this embodiment of the present application, the frequency of the inverter alternating current end voltage can be deviated to the second frequency by using the phase-shift loop, so that the second frequency triggers frequency protection to disconnect the inverter from an electrical network, to be specific, the inverter is out of the island state.

Figure 3:
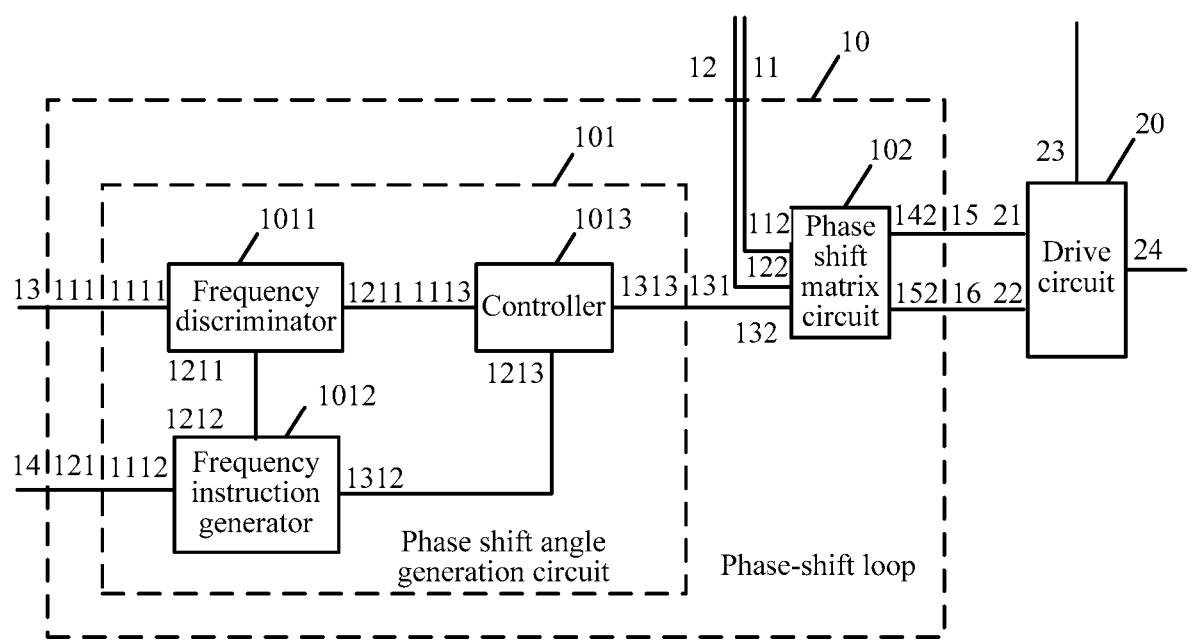
FIG. 3 is a schematic structural diagram of another inverter anti-islanding control system according to an embodiment of the present application.

FIG. 3 is a schematic structural diagram of another inverter anti-islanding control system according to an embodiment of the present application. As shown in FIG. 3, the inverter anti-islanding control system described in this embodiment includes a phase-shift loop 10 and a drive circuit 20.

The phase-shift loop 10 includes a first input end 11, a second input end 12, a third input end 13, a fourth input end 14, a first output end 15, and a second output end 16. The drive circuit 20 includes a first input end 21, a second input end 22, a third input end 23, and an output end 24.

The first output end 15 of the phase-shift loop 10 is connected to the first input end 21 of the drive circuit 20, and the second output end 16 of the phase-shift loop 10 is connected to the second input end 22 of the drive circuit 20.

The phase-shift loop 10 includes a phase shift angle generation circuit 101 and a phase shift matrix circuit 102.

The phase shift angle generation circuit 101 includes a first input end 111, a second input end 121, and an output end 131. The phase shift matrix circuit 102 includes a first input end 112, a second input end 122, a third input end 132, a first output end 142, and a second output end 152.

The output end 131 of the phase shift angle generation circuit 101 is connected to the third input end 132 of the phase shift matrix circuit 102.

The phase shift angle generation circuit 101 includes a frequency discriminator 1011, a frequency instruction generator 1012, and a controller 1013.

The frequency discriminator 1011 includes an input end 1111 and an output end 1211. The frequency instruction generator 1012 includes a first input end 1112, a second output end 1212, and an output end 1312. The controller 1013 includes a first input end 1113, a second input end 1213, and an output end 1313.

The output end 1211 of the frequency discriminator 1011 is connected to the second input end 1212 of the frequency instruction generator 1012 and the first input end 1113 of the controller 1013. The output end 1312 of the frequency instruction generator 1012 is connected to the second input end 1213 of the controller 1013.

The frequency discriminator 1011 outputs a frequency of an inverter alternating current end voltage as a first frequency based on the inverter alternating current end voltage. The inverter alternating current end voltage reaches the frequency discriminator 1011 through the input end 1111 of the frequency discriminator 1011, and the first frequency reaches the second input end 1212 of the frequency instruction generator 1012 and the first input end 1113 of the controller 1013 through the output end 1211 of the frequency discriminator 1011.

The frequency instruction generator 1012 determines a frequency instruction based on the first frequency and frequency protection information in a grid connection standard. The frequency protection information reaches the frequency instruction generator 1012 through the first input end 1112 of the frequency instruction generator 1012, and the frequency instruction reaches the second input end 1213 of the controller 1013 through the output end 1312 of the frequency instruction generator 1012.

Further, the frequency protection information includes an underfrequency protection threshold $f_{min}$, an underfrequency protection time $T_1$, an overfrequency protection threshold $f_{max}$, and an overfrequency protection time $T_2$. In addition, a normal working frequency range is $f_{min}$ to $f_{max}$. When the first frequency is within the normal working frequency range, the frequency instruction output by the frequency instruction generator 1012 is the first frequency; or when the first frequency is not within the normal working frequency range and $T_1<T_2$, the frequency instruction output by the frequency instruction generator 1012 is $f_{min}$; or when the first frequency is not within the normal working frequency range and $T_1>T_2$, the frequency instruction output by the frequency instruction generator 1012 is $f_{max}$.

Therefore, when the first frequency is not within the normal working frequency range, the frequency instruction generator sets a frequency protection threshold with a relatively short protection time as the frequency instruction. Consequently, when the inverter outputs an alternating current voltage having a second frequency, the second frequency is deviated to the frequency protection threshold with the relatively short protection time. Therefore, if the second frequency triggers frequency protection, the inverter can be disconnected from the electrical network after the inverter is run for the relatively short time. Therefore, in this embodiment, when an island effect occurs in the inverter, the inverter can be out of an island state as fast as possible.

In an optional implementation, the frequency protection information includes an underfrequency protection threshold $f_{min}$, an underfrequency protection time $T_1$, an overfrequency protection threshold $f_{max}$, and an overfrequency protection time $T_2$, and a normal working frequency range is $k_1 f_{min}$ to $k_2 f_{max}$, where $k_1$ is greater than 1, $k_2$ is less than 1, and $k_1 f_{min} < k_2 f_{max}$, and the normal working frequency range is enabled to be less than a range of $f_{min}$ to $f_{max}$. For example, $k_1$ may be 1.1, and $k_2$ may be 0.9. When the first frequency is within the normal working frequency range, the frequency instruction output by the frequency instruction generator 1012 is the first frequency; or when the first frequency is not within the normal working frequency range and $T_1<T_2$, the frequency instruction output by the frequency instruction generator 1012 is $f_{min}$; or when the first frequency is not within the normal working frequency range and $T_1>T_2$ the frequency instruction output by the frequency instruction generator 1012 is $f_{max}$.

Figure 4:
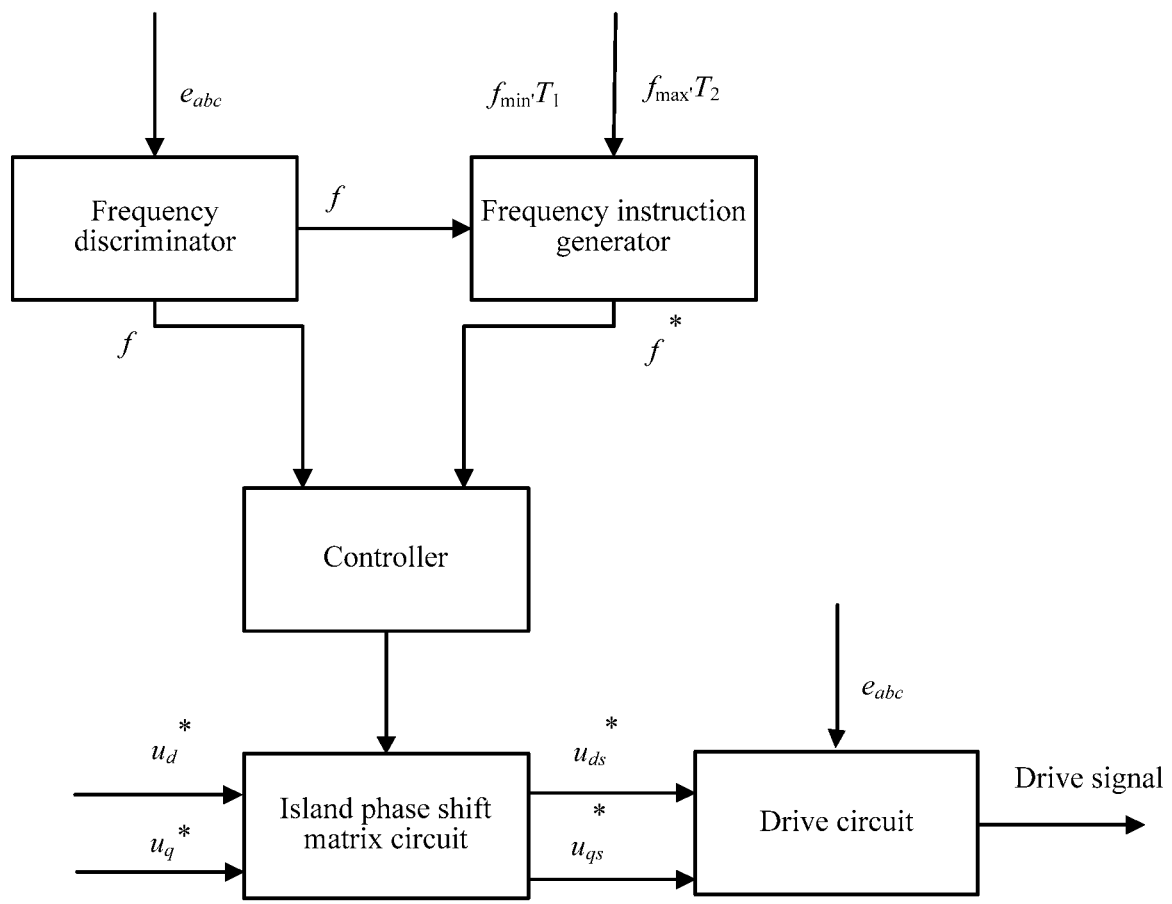
FIG. 4 is a schematic flowchart of determining a frequency instruction according to an embodiment of the present application.

FIG. 4 is a schematic flowchart of determining a frequency instruction by a frequency instruction generator. When $T_1<T_2$ and $f<k_1 f_{min}$, a frequency instruction f* is set to $f_{min}$; or when $T_1<T_2$ and $f>k_1 f_{min}$, a frequency instruction f* is set to a first frequency $f_{min}$; or when $T_1>T_2$ and $f>k_2 f_{min}$, a frequency instruction is set to $f_{max}$; or when $T_1>T_2$ and $f<k_2 f_{min}$, a frequency instruction is set to a first frequency f.

The controller 1013 determines a phase shift angle based on the first frequency and the frequency instruction. The phase shift angle reaches the third input end 132 of the phase shift matrix circuit 102 through the output end 1313 of the controller 1013. The controller 1013 may be a proportional controller, a proportional integral controller, a proportional derivative controller, or the like. For example, in this embodiment of the present application, the controller 1013 is a proportional integral controller.

Figure 5:
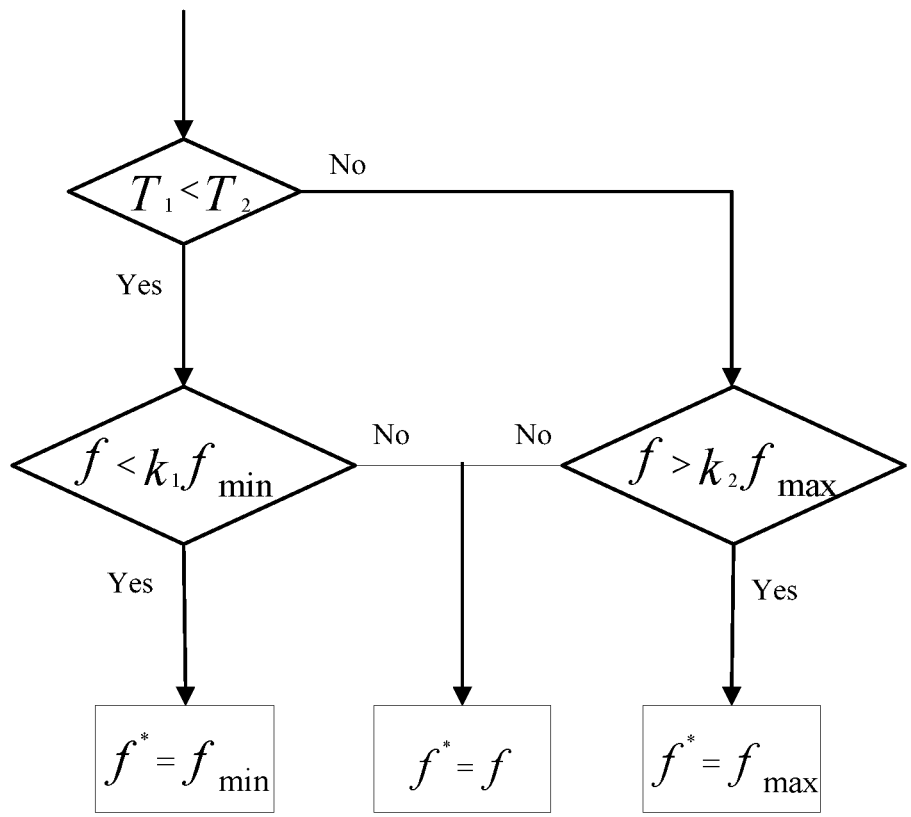
FIG. 5 is a schematic diagram of a signal flow in the inverter anti-islanding control system disclosed in FIG. 3.

FIG. 5 is a schematic diagram of a signal flow in the inverter anti-islanding control system described in FIG. 3. In the inverter anti-islanding control system described in FIG. 3, the frequency discriminator outputs a frequency of an inverter alternating current end voltage $e_{abc}$ as a first frequency f based on the inverter alternating current end voltage. The frequency instruction generator reads frequency protection information in a grid connection standard, and determines a frequency instruction f* based on an underfrequency protection threshold $f_{min}$, an underfrequency protection time $T_1$, an overfrequency protection threshold $f_{max}$, an overfrequency protection time $T_2$, and the first frequency f in the frequency protection information. The controller outputs a phase shift angle $\Delta\theta$ based on the frequency instruction and the first frequency. The island phase shift matrix circuit changes, based on the phase shift angle $\Delta\theta$, an active voltage instruction $U^*_d$ and a reactive voltage instruction $U^*_q$ that are output by an active current control unit and a reactive current control unit, and outputs a phase-shifted active voltage instruction $U^*_{ds}$ and a phase-shifted reactive voltage instruction $U^*_{qs}$. The drive circuit generates a drive signal based on $U^*_{ds}$, $U^*_{qs}$, and the inverter alternating current end voltage $e_{abc}$, to drive the inverter to output an alternating current voltage having a second frequency. The second frequency is deviated to a frequency protection threshold with a relatively short time relative to the first frequency. If the second frequency triggers underfrequency or overfrequency protection, the inverter is disconnected from the electrical network, to be specific, the inverter is out of an island power generation system, after the inverter is run for an underfrequency/overfrequency protection time.

Figure 6A:
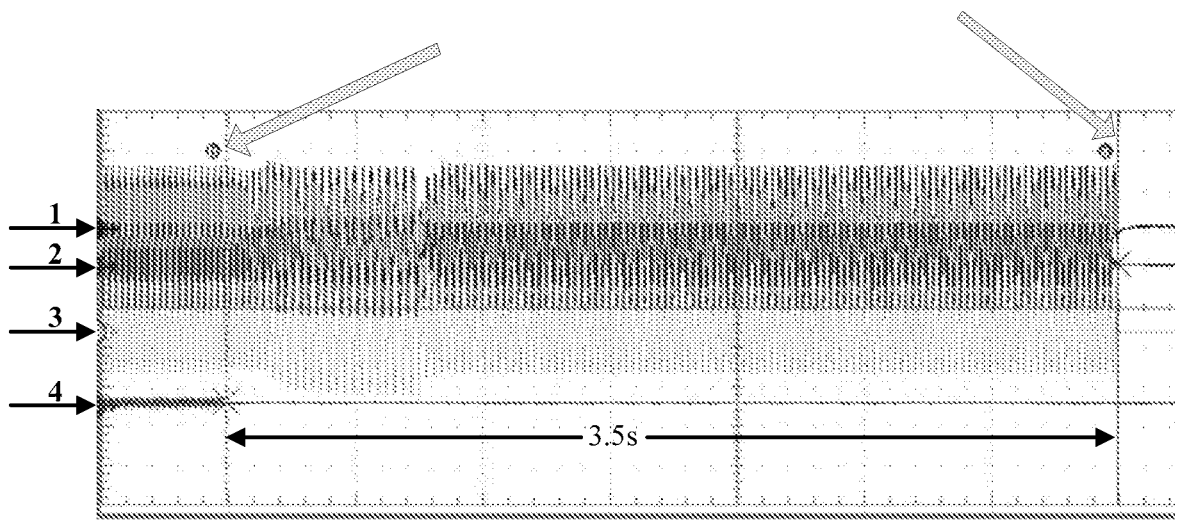
FIG. 6a is a schematic waveform diagram of performing an island detection experiment without using the inverter anti-islanding control system disclosed in FIG. 3.

For example, in a Spanish grid connection standard, an underfrequency protection time is 3 s, an island protection time is 2 s, and the underfrequency protection time is greater than the island protection time. FIG. 6a is a schematic waveform diagram of performing island detection without using the inverter anti-islanding control system disclosed in FIG. 3. As shown in FIG. 6a, the first channel of waveform to the third channel of waveform in the figure are waveforms of a three-phase output current of the inverter, and the fourth channel of waveform is a waveform of a current detected at a grid-connected switch. At moment 2, the grid-connected switch is turned off, and the current detected at the grid-connected switch is decreased to 0, to be specific, an island effect occurs. At moment a, the inverter is disconnected from the electrical network, and the three-phase output current is decreased to 0, to be specific, the inverter is out of the island state. It can be learned from the waveform diagram that, when the inverter anti-islanding control system described in FIG. 3 is not used, after an island phenomenon occurs in the inverter, the inverter needs to be run for 3.5 seconds and then the inverter can be out of the island state. 3.5 seconds is longer than the island protection time stipulated in the grid connection standard and does not satisfy an island protection requirement in the grid connection standard.

Figure 6B:
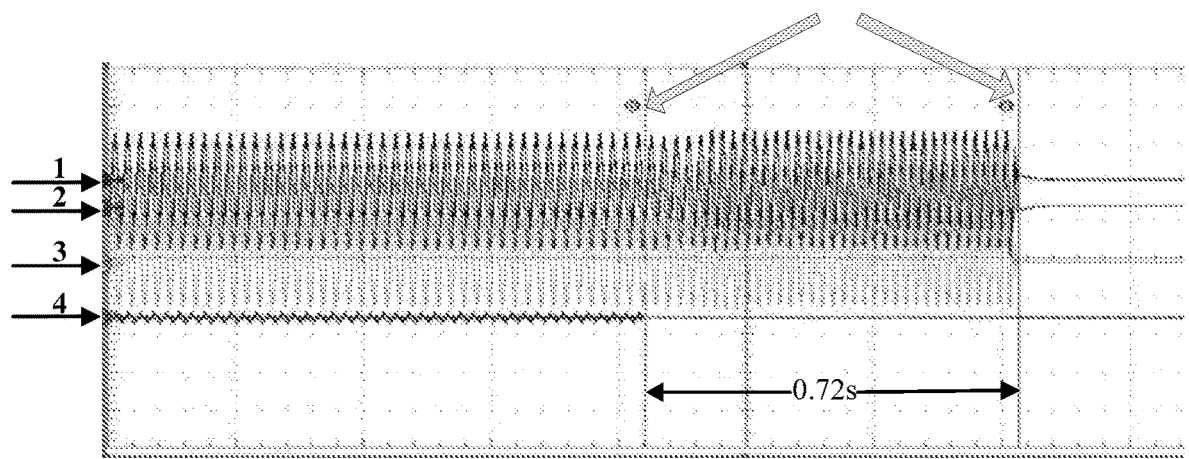
FIG. 6b is a schematic waveform diagram of performing an island detection experiment by using the inverter anti-islanding control system disclosed in FIG. 3.

However, FIG. 6b is a schematic waveform diagram of performing an island detection experiment by using the inverter anti-islanding control system disclosed in FIG. 3. As shown in FIG. 6b, the first channel of waveform to the third channel of waveform in the figure are waveforms of a three-phase output current of the inverter, and the fourth channel of waveform is a waveform of a current detected at a grid-connected switch. At moment b, the grid-connected switch is turned off, and the current detected at the grid-connected switch is decreased to 0, to be specific, an island effect occurs. At moment a, the inverter is disconnected from the electrical network, and the three-phase output current is decreased to 0, to be specific, the inverter is out of the island state. It can be learned from the waveform diagram that, the inverter anti-islanding control system described in FIG. 3 is used, after an island phenomenon occurs in the inverter, the inverter can be out of the island state after being running for only 0.72 s. 0.72 s is shorter than the island protection time (2 s) and satisfies an island protection requirement in the Spanish grid connection standard.

Therefore, when the first frequency is not within the normal working frequency range, the frequency instruction generator sets a frequency protection threshold with a relatively short protection time as the frequency instruction. Consequently, when the inverter outputs the alternating current voltage having the second frequency, the second frequency is deviated to the frequency protection threshold with the relatively short protection time. Therefore, if the second frequency triggers frequency protection, the inverter can be disconnected from the electrical network after the inverter is run for the relatively short time. Therefore, in this embodiment, when the island effect occurs in the inverter, the inverter can be out of the island state as fast as possible.

Figure 7:
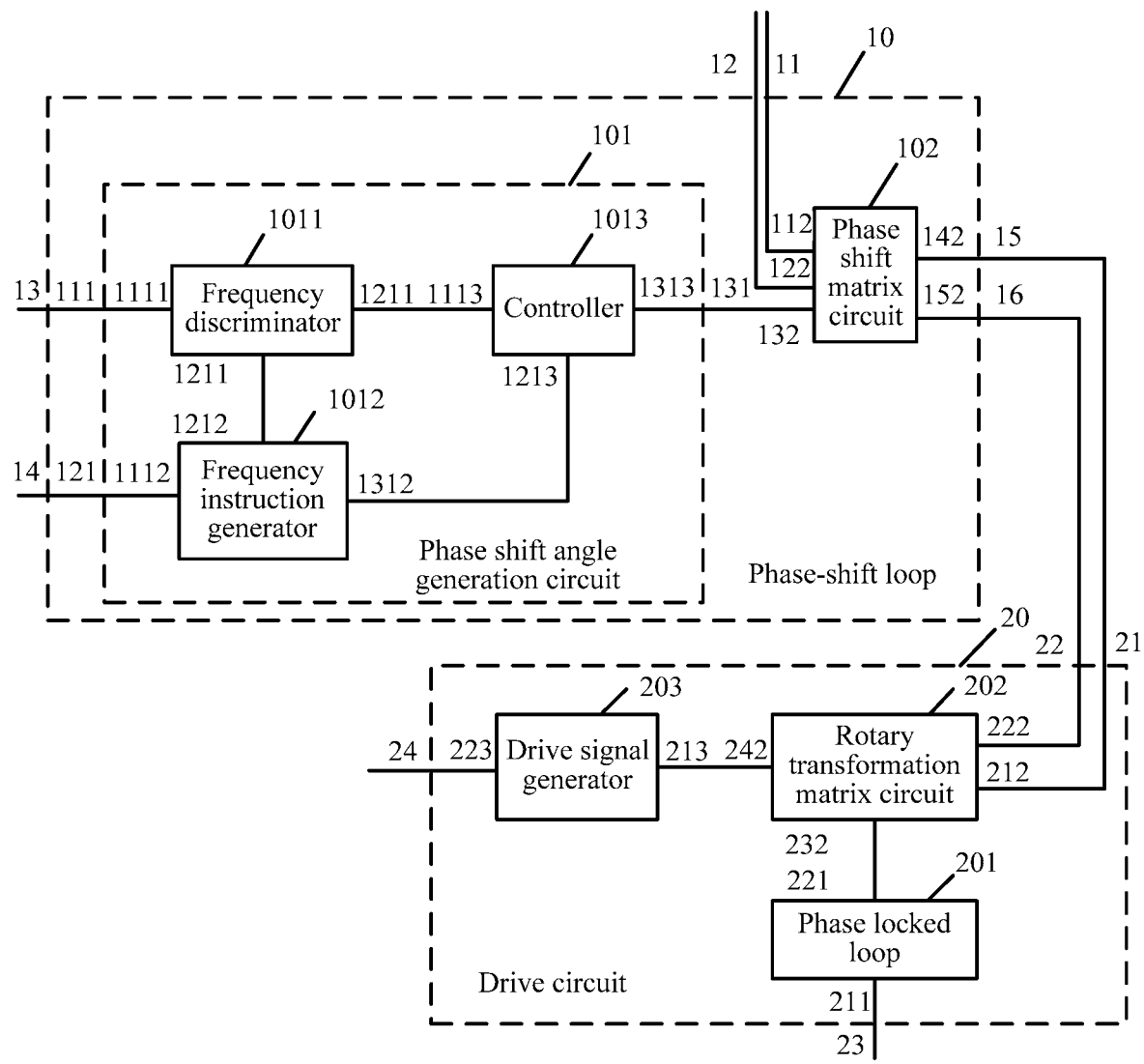
FIG. 7 is a schematic structural diagram of another inverter anti-islanding control system according to an embodiment of the present application.

FIG. 7 is a schematic structural diagram of another inverter anti-islanding control system according to an embodiment of the present application. As shown in FIG. 7, the inverter anti-islanding control system described in this embodiment includes a phase-shift loop 10 and a drive circuit 20.

The phase-shift loop 10 includes a first input end 11, a second input end 12, a third input end 13, a fourth input end 14, a first output end 15, and a second output end 16. The drive circuit 20 includes a first input end 21, a second input end 22, a third input end 23, and an output end 24.

The first output end 15 of the phase-shift loop 10 is connected to the first input end 21 of the drive circuit 20, and the second output end 16 of the phase-shift loop 10 is connected to the second input end 22 of the drive circuit 20.

The phase-shift loop 10 includes a phase shift angle generation circuit 101 and a phase shift matrix circuit 102.

The phase shift angle generation circuit 101 includes a first input end 111, a second input end 121, and an output end 131. The phase shift matrix circuit 102 includes a first input end 112, a second input end 122, a third input end 132, a first output end 142, and a second output end 152.

The output end 131 of the phase shift angle generation circuit 101 is connected to the third input end 132 of the phase shift matrix circuit 102.

The phase shift angle generation circuit 101 includes a frequency discriminator 1011, a frequency instruction generator 1012, and a controller 1013.

The frequency discriminator 1011 includes an input end 1111 and an output end 1211. The frequency instruction generator 1012 includes a first input end 1112, a second output end 1212, and an output end 1312. The controller 1013 includes a first input end 1113, a second input end 1213, and an output end 1313.

The output end 1211 of the frequency discriminator 1011 is connected to the second input end 1212 of the frequency instruction generator 1012 and the first input end 1113 of the controller 1013. The output end 1312 of the frequency instruction generator 1012 is connected to the second input end 1213 of the controller 1013.

Further, the drive circuit 20 includes a phase locked loop 201, a rotation transformation matrix circuit 202, and a drive signal generator 203.

The phase locked loop 201 includes an input end 211 and an output end 221. The rotation transformation matrix circuit 202 includes a first input end 212, a second input end 222, a third input end 232, and an output end 242. The drive signal generator 203 includes an input end 213 and an output end 223.

The output end 221 of the phase locked loop 201 is connected to the third input end 232 of the rotation transformation matrix circuit 202, and the output end 242 of the rotation transformation matrix circuit 202 is connected to the input end 213 of the drive signal generator 203.

The phase locked loop 201 obtains phase information of the inverter alternating current end voltage based on the inverter alternating current end voltage. The inverter alternating current end voltage reaches the phase locked loop 201 through the input end 211 of the phase locked loop 201, and the phase information of the inverter alternating current end voltage reaches the third input end 232 of the rotation transformation matrix circuit 202 through the output end 221 of the phase locked loop 201.

The rotation transformation matrix circuit 202 converts $U^*_{ds}$ and $U^*_{qs}$ into a three-phase modulation signal based on the phase information of the inverter alternating current end voltage. $U^*_{ds}$ and $U^*_{qs}$ reach the rotation transformation matrix circuit 202 through the first input end 212 and the second input end 222 of the rotation transformation matrix circuit 202, and the three-phase modulation signal reaches the input end 213 of the drive signal generator 203 through the output end of the rotation transformation matrix circuit 202.

The drive signal generator 203 generates the drive signal based on the three-phase modulation signal. The drive signal reaches the inverter through the output end 223 of the drive signal generator 203, to drive the inverter to output an alternating current voltage having a second frequency, and the second frequency is used to control a connection between the inverter and an electrical network to be disconnected or maintained.

When the inverter is in an island state, a frequency of the inverter alternating current end voltage deviates from a normal working range. In this embodiment of the present application, the frequency of the inverter alternating current end voltage can be deviated to the second frequency by using the phase-shift loop, so that the second frequency triggers frequency protection to disconnect the inverter from the electrical network, to be specific, the inverter is out of the island state.

Figure 8:
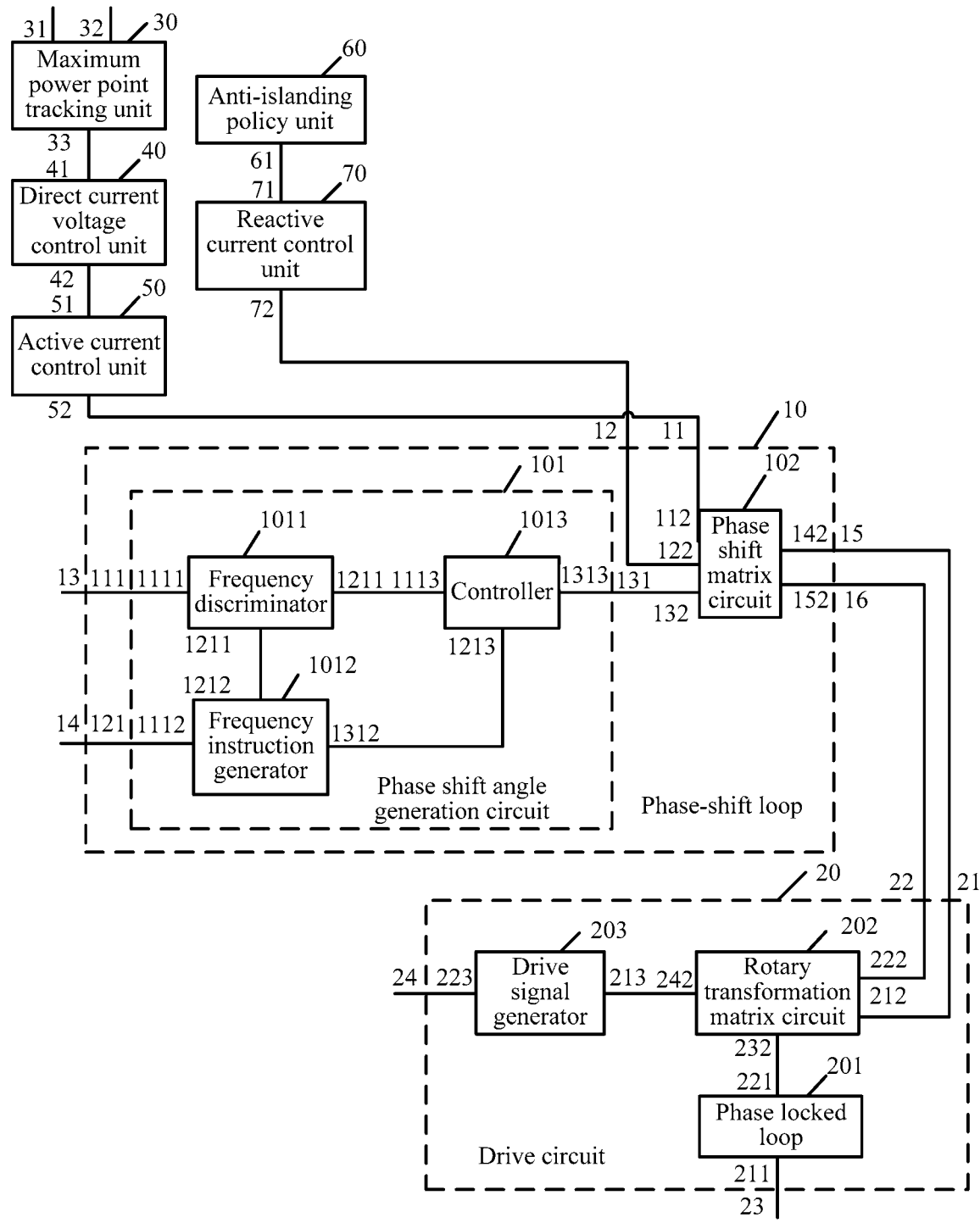
FIG. 8 is a schematic structural diagram of another inverter anti-islanding control system according to an embodiment of the present application.

FIG. 8 is a schematic structural diagram of another inverter anti-islanding control system according to an embodiment of the present application. As shown in FIG. 8, the inverter anti-islanding control system described in this embodiment includes a phase-shift loop 10 and a drive circuit 20.

The phase-shift loop 10 includes a first input end 11, a second input end 12, a third input end 13, a fourth input end 14, a first output end 15, and a second output end 16. The drive circuit 20 includes a first input end 21, a second input end 22, a third input end 23, and an output end 24.

The first output end 15 of the phase-shift loop 10 is connected to the first input end 21 of the drive circuit 20, and the second output end 16 of the phase-shift loop 10 is connected to the second input end 22 of the drive circuit 20.

The phase-shift loop 10 includes a phase shift angle generation circuit 101 and a phase shift matrix circuit 102.

The phase shift angle generation circuit 101 includes a first input end 111, a second input end 121, and an output end 131. The phase shift matrix circuit 102 includes a first input end 112, a second input end 122, a third input end 132, a first output end 142, and a second output end 152.

The output end 131 of the phase shift angle generation circuit 101 is connected to the third input end 132 of the phase shift matrix circuit 102

The phase shift angle generation circuit 101 includes a frequency discriminator 1011, a frequency instruction generator 1012, and a controller 1013.

The frequency discriminator 1011 includes an input end 1111 and an output end 1211. The frequency instruction generator 1012 includes a first input end 1112, a second output end 1212, and an output end 1312. The controller 1013 includes a first input end 1113, a second input end 1213, and an output end 1313.

The output end 1211 of the frequency discriminator 1011 is connected to the second input end 1212 of the frequency instruction generator 1012 and the first input end 1113 of the controller 1013. The output end 1312 of the frequency instruction generator 1012 is connected to the second input end 1213 of the controller 1013.

Further, the drive circuit 20 includes a phase locked loop 201, a rotation transformation matrix circuit 202, and a drive signal generator 203.

The phase locked loop 201 includes an input end 211 and an output end 221. The rotation transformation matrix circuit 202 includes a first input end 212, a second input end 222, a third input end 232, and an output end 242. The drive signal generator 203 includes an input end 213 and an output end 223.

The output end 221 of the phase locked loop 201 is connected to the third input end 232 of the rotation transformation matrix circuit 202, and the output end 242 of the rotation transformation matrix circuit 202 is connected to the input end 213 of the drive signal generator 203.

In addition, in this embodiment, the inverter anti-islanding control system further includes:

a maximum power point tracking unit 30, a direct current voltage control unit 40, an active current control unit 50, an anti-islanding policy unit 60, and a reactive current control unit 70.

The maximum power point tracking unit 30 includes a first input end 31, a second input end 32, and an output end 33. The direct current voltage control unit 40 includes an input end 41 and an output end 42. The active current control unit 50 includes an input end 51 and an output end 52. The anti-islanding policy unit 60 includes an output end 61. The reactive current control unit 70 includes an input end 71 and an output end 72.

The output end 33 of the maximum power point tracking unit 30 is connected to the input end 41 of the direct current voltage control unit 40, the output end 42 of the direct current voltage control unit 40 is connected to the input end 51 of the active current control unit 50, and the output end 61 of the anti-islanding policy unit 60 is connected to the input end 71 of the reactive current control unit 70.

The maximum power point tracking unit 30 determines, based on a direct current voltage and a direct current at an output end of a new energy power generation module, a maximum power point voltage output by the new energy power generation module. The direct current voltage and the direct current reach the maximum power point tracking unit 30 through the first input end 31 and the second input end 32 of the maximum power point tracking unit 30, and the maximum power point voltage reaches the input end 41 of the direct current voltage control unit 40 through the output end 33 of the maximum power point tracking unit 30.

The direct current voltage control unit 40 generates an active current instruction based on the maximum power point voltage. The active current instruction reaches the input end 51 of the active current control unit 50 through the output end 42 of the direct current voltage control unit 40.

The active current control unit 50 generates an active voltage instruction $U^*_d$ based on the active current instruction. $U^*_d$ reaches the first input end 11 of the phase-shift loop 10 through the output end 52 of the active current control unit 50.

The anti-islanding policy unit 60 is configured to generate a reactive current instruction. The reactive current instruction reaches the input end 71 of the reactive current control unit 70 through the output end 61 of the anti-islanding policy unit 60.

The reactive current control unit 70 is configured to generate a reactive voltage instruction $U^*_q$ based on the reactive current instruction. $U^*_q$ reaches the second input end 12 of the phase-shift loop 10 through the output end 72 of the reactive current control unit 70.

When the inverter is in an island state, a frequency of an inverter alternating current end voltage deviates from a normal working range. In this embodiment of the present application, the frequency of the inverter alternating current end voltage can be deviated to a second frequency by using the phase-shift loop, so that the second frequency triggers frequency protection to disconnect the inverter from an electrical network, to be specific, the inverter is out of the island state.

The inverter anti-islanding control system provided in the embodiments of the present application is described above in detail. Although the principles and implementations of the present application are described by using specific examples in this specification, the foregoing descriptions of the embodiments are only intended to help understand the method and core idea of the method of the present application. However, the foregoing descriptions are not intended to limit the protection scope of the present application. Any variation or replacement readily figured out by a person skilled in the art within the technical scope disclosed in the embodiments of the present application shall fall within the protection scope of the present application. Therefore, the protection scope of the present application shall be subject to the protection scope of the claims.

What is claimed is:

1. An inverter anti-islanding control system, comprising:
a phase-shift loop; and
a drive circuit, wherein:
the phase-shift loop comprises a first input end, a second input end, a third input end, a fourth input end, a first output end, and a second output end;
the drive circuit comprises a first input end, a second input end, a third input end, and an output end;
the first output end of the phase-shift loop is connected to the first input end of the drive circuit, and the second output end of the phase-shift loop is connected to the second input end of the drive circuit;

the phase-shift loop is configured to perform phase shift conversion on an active voltage instruction ($U^*_d$) and a reactive voltage instruction ($U^*_q$) based on an inverter alternating current end voltage and frequency protection information in a grid connection standard, to obtain a phase-shifted active voltage instruction ($U^*_{ds}$) and a phase-shifted reactive voltage instruction ($U^*_{qs}$), wherein:

$U^*_d$, $U^*_q$, the inverter alternating current end voltage, and the frequency protection information in the grid connection standard reach the phase-shift loop respectively through the first input end, the second input end, the third input end, and the fourth input end of the phase-shift loop, $U^*_{ds}$ reaches the first input end of the drive circuit through the first output end of the phase-shift loop, and $U^*_{qs}$ reaches the second input end of the drive circuit through the second output end of the phase-shift loop; and the drive circuit is configured to generate a drive signal based on $U^*_{ds}$, $U^*_{qs}$, and the inverter alternating current end voltage, wherein:

the inverter alternating current end voltage reaches the drive circuit through the third input end of the drive circuit;

the drive signal reaches an inverter through the output end of the drive circuit, to drive the inverter to output an alternating current voltage having a second frequency, and the second frequency is used to control a connection between the inverter and an electrical network to be disconnected or maintained.

2. The system according to claim 1, wherein the phase-shift loop comprises a phase shift angle generation circuit and a phase shift matrix circuit, wherein:

the phase shift angle generation circuit comprises a first input end, a second input end, and an output end; and the phase shift matrix circuit comprises a first input end, a second input end, a third input end, a first output end, and a second output end;

wherein the output end of the phase shift angle generation circuit is connected to the third input end of the phase shift matrix circuit;

wherein the phase shift angle generation circuit is configured to generate a phase shift angle based on the inverter alternating current end voltage and the frequency protection information, wherein:

the inverter alternating current end voltage and the frequency protection information reach the phase shift angle generation circuit respectively through the first input end and the second input end of the phase shift angle generation circuit, and the phase shift angle reaches the third input end of the phase shift matrix circuit through the output end of the phase shift angle generation circuit; and wherein the phase shift matrix circuit is configured to perform phase shift conversion on $U^*_d$ and $U^*_q$ based on the phase shift angle, to obtain $U^*_{ds}$ and $U^*_{qs}$, wherein:

$U^*_d$ and $U^*_q$ reach the phase shift matrix circuit respectively through the first input end and the second input end of the phase shift matrix circuit, $U^*_{ds}$ reaches the first input end of the drive circuit through the first output end of the phase shift matrix circuit, and $U^*_{qs}$ reaches the second input end of the drive circuit through the second output end of the phase shift matrix circuit.

3. The system according to claim 2, wherein the phase shift angle generation circuit comprises a frequency discriminator, a frequency instruction generator, and a controller, wherein:

the frequency discriminator comprises an input end and an output end;

the frequency instruction generator comprises a first input end, a second input end, and an output end; and the controller comprises a first input end, a second input end, and an output end;

wherein the output end of the frequency discriminator is connected to the second input end of the frequency instruction generator and the first input end of the controller; and the output end of the frequency instruction generator is connected to the second input end of the controller;

wherein the frequency discriminator is configured to output a frequency of the inverter alternating current end voltage as a first frequency based on the inverter alternating current end voltage, wherein the inverter alternating current end voltage reaches the frequency discriminator through the input end of the frequency discriminator, and the first frequency reaches the second input end of the frequency instruction generator and the first input end of the controller through the output end of the frequency discriminator;

wherein the frequency instruction generator is configured to determine a frequency instruction based on the first frequency and the frequency protection information, wherein the frequency protection information reaches the frequency instruction generator through the first input end of the frequency instruction generator, and the frequency instruction reaches the second input end of the controller through the output end of the frequency instruction generator; and wherein the controller is configured to determine the phase shift angle based on the first frequency and the frequency instruction, wherein the phase shift angle reaches the third input end of the phase shift matrix circuit through the output end of the controller.

4. The system according to claim 3, wherein the frequency protection information comprises an underfrequency protection threshold ($f_{min}$), an underfrequency protection time ($T_1$), an overfrequency protection threshold ($f_{max}$), and an overfrequency protection time ($T_2$);

wherein a normal working frequency range is $f_{min}$ to $f_{max}$; and wherein that the frequency instruction generator is configured to determine a frequency instruction based on the first frequency and the frequency protection information comprises:

if the first frequency is within the normal working frequency range, the frequency instruction output by the frequency instruction generator is the first frequency;

if the first frequency is not within the normal working frequency range and $T_1 < T_2$, the frequency instruction output by the frequency instruction generator is $f_{min}$; or if the first frequency is not within the normal working frequency range and $T_1 > T_2$, the frequency instruction output by the frequency instruction generator is $f_{max}$.

5. The system according to claim 1, wherein the drive circuit comprises:
a phase locked loop, a rotation transformation matrix circuit, and a drive signal generator, wherein:
the phase locked loop comprises an input end and an output end;
the rotation transformation matrix circuit comprises a first input end, a second input end, a third input end, and an output end; and
the drive signal generator comprises an input end and an output end;
wherein the output end of the phase locked loop is connected to the third input end of the rotation transformation matrix circuit, and the output end of the rotation transformation matrix circuit is connected to the input end of the drive signal generator;
wherein the phase locked loop is configured to obtain phase information of the inverter alternating current end voltage based on the inverter alternating current end voltage, wherein:
the inverter alternating current end voltage reaches the phase locked loop through the input end of the phase locked loop, and
the phase information of the inverter alternating current end voltage reaches the third input end of the rotation transformation matrix circuit through the output end of the phase locked loop;
wherein the rotation transformation matrix circuit is configured to convert $U^*_{ds}$ and $U^*_{qs}$ into a three-phase modulation signal based on the phase information of the inverter alternating current end voltage, wherein:
$U^*_{ds}$ and $U^*_{qs}$ reach the rotation transformation matrix circuit through the first input end and the second input end of the rotation transformation matrix circuit, and
the three-phase modulation signal reaches the input end of the drive signal generator through the output end of the rotation transformation matrix circuit; and
wherein the drive signal generator is configured to generate the drive signal based on the three-phase modulation signal, wherein:
the drive signal reaches the inverter through the output end of the drive signal generator, to drive the inverter to output the alternating current voltage having the second frequency, and
the second frequency is used to control the connection between the inverter and the electrical network to be disconnected or maintained.

6. The system according to claim 5, wherein the system further comprises:
a maximum power point tracking unit, a direct current voltage control unit, an active current control unit, an anti-islanding policy unit, and a reactive current control unit, wherein:
the maximum power point tracking unit comprises a first input end, a second input end, and an output end;
the direct current voltage control unit comprises an input end and an output end;
the active current control unit comprises an input end and an output end;
the anti-islanding policy unit comprises an output end; and
the reactive current control unit comprises an input end and an output end;
wherein the output end of the maximum power point tracking unit is connected to the input end of the direct current voltage control unit, the output end of the direct current voltage control unit is connected to the input end of the active current control unit, and the output end of the anti-islanding policy unit is connected to the input end of the reactive current control unit;
wherein the maximum power point tracking unit is configured to determine, based on a direct current voltage and a direct current at an output end of a new energy power generation module, a maximum power point voltage output by the new energy power generation module, wherein:
the direct current voltage and the direct current reach the maximum power point tracking unit through the first input end and the second input end of the maximum power point tracking unit, and
the maximum power point voltage reaches the input end of the direct current voltage control unit through the output end of the maximum power point tracking unit;
wherein the direct current voltage control unit is configured to generate an active current instruction based on the maximum power point voltage, wherein the active current instruction reaches the input end of the active current control unit through the output end of the direct current voltage control unit;
wherein the active current control unit is configured to generate the active voltage instruction $U^*_d$ based on the active current instruction, wherein $U^*_d$ reaches the first input end of the phase-shift loop through the output end of the active current control unit;
wherein the anti-islanding policy unit is configured to generate a reactive current instruction, wherein the reactive current instruction reaches the input end of the reactive current control unit through the output end of the anti-islanding policy unit; and
wherein the reactive current control unit is configured to generate the reactive voltage instruction $U^*_q$ based on the reactive current instruction, wherein $U^*_q$ reaches the second input end of the phase-shift loop through the output end of the reactive current control unit.

7. The system according to claim 2, wherein a phase shift matrix corresponding to the phase shift matrix circuit is:

$$\begin{bmatrix} \cos\Delta\theta & \sin\Delta\theta \\ -\sin\Delta\theta & \cos\Delta\theta \end{bmatrix},$$

wherein
$\Delta\theta$ is the phase shift angle.

8. The system according to claim 2, wherein $U^*_{ds}$ and $U^*_{qs}$ are:

$$\begin{cases} U^*_{ds} = U^*_d \cos\Delta\theta - U^*_q \sin\Delta\theta \\ U^*_{qs} = U^*_d \sin\Delta\theta + U^*_q \cos\Delta\theta \end{cases},$$

wherein
$\Delta\theta$ is the phase shift angle.

9. The system according to claim 1, wherein the inverter is any one of a single-phase inverter, a three-phase inverter, a two-level topology inverter, or a multi-level topology inverter.

10. The system according to claim 3, wherein the controller is any one of a proportional controller, a proportional integral controller, or a proportional derivative controller.

* * * * *